United States Patent [19]

Sun et al.

[11] 4,393,038

[45] Jul. 12, 1983

[54] HYDROGEN PEROXIDE PRODUCTION

[75] Inventors: Hsiang-ning Sun, Media; John J. Leonard, Springfield; Harold Shalit, Bala Cynwyd, all of Pa.

[73] Assignee: Atlantic Richfield Company, Los Angeles, Calif.

[21] Appl. No.: 312,060

[22] Filed: Oct. 16, 1981

[51] Int. Cl.$^3$ ............................................. C01B 15/02
[52] U.S. Cl. .................................................. 423/584
[58] Field of Search ......................................... 423/584

[56] References Cited

U.S. PATENT DOCUMENTS 1,108,752  8/1941  Henkel et al. ........................ 423/584
4,035,471  7/1977  Strong ................................... 423/584

FOREIGN PATENT DOCUMENTS 579535   7/1959  Canada ........................... 423/648 R
1188866  3/1965  Fed. Rep. of Germany ...... 423/584
1402366  5/1965  France ................................ 423/584

OTHER PUBLICATIONS

Bretschger et al., "Concentrated Hydrogen Peroxide," *The Electrochemical Society* (1947), pp. 487–496.

Kirk–Othmer, *Encyclopedia of Chemical Technology*, (1966), John Wiley & Sons, Inc., vol. 11, pp. 366–369, Second Edition.

*Primary Examiner*—O. R. Vertiz
*Assistant Examiner*—Wayne A. Langel
*Attorney, Agent, or Firm*—Coleman R. Reap; Dennis M. Kozak; John C. Martin, Jr.

[57] ABSTRACT

Hydrogen is diffused through a palladium-containing membrane into an aqueous solution containing ions of a stabilizing nature and containing dissolved oxygen to form hydrogen peroxide. Some water is formed as a by-product. The hydrogen peroxide may be identified and/or recovered from said aqueous solution in an identification zone.

3 Claims, No Drawings

HYDROGEN PEROXIDE PRODUCTION

FIELD OF INVENTION

This invention relates to the preparation of hydrogen peroxide by reaction by hydrogen and oxygen.

BACKGROUND OF THE INVENTION

As taught by Henkel et al U.S. Pat. No. 1,108,752 at temperatures generally below the ordinary ignition point of hydrogen, palladium is a catalyst promoting the formation of both hydrogen perioxide and water. Such synthesis of hydrogen peroxide from the elements has aroused interest, leading to disclosures such as Hooper U.S. Pat. No. 3,336,112, Hooper U.S. Pat. No. 3,361,533 and Kim et al U.S. Pat. No. 4,007,256. It has been the standard practice of prior art technologists to prepare a mixture of gaseous oxygen and gaseous hydrogen for introduction to the synthesis catalyst. Such gaseous mixtures of hydrogen and oxygen are of an explosive nature. To the extent that a catalyst becomes deactivated and/or to the extent that the explosive gaseous mixture permeates into zones other than those initially intended, certain safety hazards have been recognized in connection with Henkel-tupe synthesis of hydrogen peroxide. There have been many situations in which the market price for hydrogen peroxide was significantly greater than the local market price for either hydrogen or oxygen. Accordingly, there has been a long standing demand for a more satisfactory method of synthesizing hydrogen peroxide from its elements.

SUMMARY OF THE INVENTION

In accordance with the present invention, a slightly acidic aqueous solution containing ions (e.g. phosphate) tending to stabilize hydrogen peroxide and substantially free from ions catalyzing the decomposition of hydrogen peroxide is prepared. Oxygen is dissolved in this solution. Dry hydrogen is supplied to the dry gaseous inner surface of a hydrogen-permeable metallic membrane having an outer surface in contact with said oxygen-containing slightly acidic aqueous solution containing stabilizing ions. After the hydrogen diffuses through said metallic membrane, such hydrogen reacts with the dissolved oxygen at the wet side of the metallic membrane to form a mixture of water and hydrogen peroxide.

Dry hydrogen is supplied to the dry inner surface of said metallic membrane. Hydrogen is supplied to the inside of said metallic membrane at a pressure maintaining the hydrogen flow through the membrane toward the wet side of the membrane. The temperature of the aqueous solution and the metallic membrane is controlled to be within the range from about 10° to about 150° C. After the hydrogen has diffused to said outer wet surface of said membrane, such hydrogen reacts with the dissolved oxygen to form a reaction product consisting of hydrogen peroxide and water. The reaction product immediately dissolves in said aqueous solution.

At least a portion of the aqueous solution is directed to an identification zone, in which the concentration of hydrogen peroxide thus produced is measured. Hydrogen peroxide is recoverable from such aqueous solution in said recovery zone by appropriate procedures as taught by prior art technology.

The metallic membrane desirably is at least predominantly palladium. All technology concerning the diffusion of hydrogen through metallic membranes into an aqueous ionic solution is deemed applicable to the present invention. Prior technology on hydrogen diffusion into a gaseous zone also has useful data. For example, the palladium-silver alloy known to be superior as a membrane for the diffusion of hydrogen into a purified gaseous hydrogen zone may be employed in the present invention.

Appropriate catalytic modifiers may, if desired, be included on the outside surface of metallic membrane. For example, the palladium-silver alloy is desirably gold-plated. A thin film of organic modifier is desirably included on the outside surface of the membrane. For example, anthraquinone is desirably coated on the outside surface of the membrane at a concentration of about 5 to 9, desirably about 7 grams per square meter. For a tube having an outside diameter of about ¼ inch and about 5½ inches long, such concentration of 7 g/m$^2$ corresponds to about 2 milligrams of anthraquinone on the outside of the tube.

The aqueous solution desirably contains about 0.34 weight percent phosphoric acid. An appropriate temperature is dependent in part upon the pressure at which the reactor is operated. If the system operates at about atmospheric pressure, then a temperature of the range from about 70° to 90° C. has advantages.

The nature of the invention is further clarified by references to a plurality of controls and examples.

CONTROL A

A gold-plated palladium tube approximately 5½ inches long and having an outside diameter of about ¼ inch is employed as the membrane for the diffusion of hydrogen. In an effort to determine whether the diffusion technique was applicable to a gaseous reaction, the gold-plated palladium tube was in a gaseous zone. Oxygen saturated with water at room temperature was directed through the reaction chamber at a flow rate of 40 cc per minute. External heating of the glass tube reactor maintained gas in the reaction chamber at about 128°. Hydrogen diffused through the gold-plated palladium tube and into the oxygen atmosphere and the glass stream effluent from the reaction chamber was directed through a pool of water maintained at about 1° C. Substantially all of the hydrogen reacted to form water so that the hydrogen peroxide content of the pool of water in the recovery zone was only 0.0017% of the molar amount of hydrogen consumed during the 992 minute test. Inasmuch as the Henkel-type process would offer commercial advantages if conducted entirely in the gaseous phase, this single evaluation of a vapor phase reaction was a disappointing failure. The reaction mechanisms by which hydrogen peroxide is formed on the surface of the diffusion membrane are not presently known. The poor yield of hydrogen peroxide in the gaseous test suggest that the reaction time for the hydrogen reactant on the diffusion membrane might be a significant factor. When the reaction product is rapdily removed by the flowing gas stream, relatively smaller amounts of hydrogen peroxide are formed.

CONTROL B

The outer diameter of a palladium tube (resembling that of Control A) is immersed in distilled water, containing dissolved oxygen. Hydrogen is diffused through the gold-plated palladium tube so that diffused hydrogen reacts with the oxygen dissolved in the water, which is maintained at 90° C. The water is supplied with oxygen through a sparger at a flow rate of 50 cc per minute. The hydrogen diffused through the palladium tube so that both hydrogen peroxide and water were formed during the 6-hour test. An analysis of the aqueous product showed that the hydrogen peroxide yield was 0.04% of the stoichiometric amount which could be hoped for on the basis of the consumption of hydrogen. Although this was about 24 times better than in the vapor phase reaction of Control A, the yield appeared to be disappointingly small. Although the cost per pound of $H_2O_2$ is sometimes in some places greater than the cost per pound of hydrogen, no process could hope to be commercially successful when the unit ratio of product $H_2O/H_2O_2$ was the magnitude of 2,500.

EXAMPLE 1

The reaction chamber resembled that of Control B except that the aqueous solution contained about 0.5% sodium pyrophosphate, which is well-known as a stabilizer for hydrogen peroxide. The reaction chamber was maintained at 76° C. Oxygen was injected through a sparger at a flow rate of 65 cc per minute. The hydrogen diffused through the gold-plated palladium tube (5.5 inches long and about 0.25 inch outside diameter) so that a mixture of water and hydrogen peroxide formed on the wet outside of the diffusion tube when the diffused hydrogen reacted with the dissolved oxygen. The yield of hydrogen peroxide was 0.08% of the stoichiometric potentiality in view of the rate of consumption of hydrogen. Although this yield was only twice as good as in the Control B test, the reaction was considered more favorably by reason of the fact that the test was conducted at 76° instead of 95° C. The presence of a stabilizing modifier and the absence of ions tending to decompose $H_2O_2$ in the aqueous system provided a significant difference between the yeild using water as the aqueous system in Control B and using a solution of sodium pyrophosphate as the aqueous system to Example 1.

EXAMPLE 2

The reaction chamber featured a palladium tube having an outside diameter of 0.25 inch and a length of about 5.5 inches. The palladium tube was coated with anthraquinone by subliming the compound onto the outside of the tube. An acidic aqueous solution having a pH of about 6 was employed in the reaction chamber. The oxygen flow rate as 50 cc per minute. The temperature was controlled at 73° C. Hydrogen peroxide was formed at a rate corresponding to 0.71% of the hydrogen consumption.

EXAMPLE 3

The reaction chamber employed a tube made of an alloy of silver and palladium desirable for diffusion of hydrogen. Such tube was coated with a thin film of a redox resin of the type described in U.S. Pat. No. 3,529,997. The reaction chamber contained an aqueous solution of lithium chloride in a weight concentration of 0.27%. Said solution of lithium chloride was slightly acidic. The reaction chamber was maintained at 86° C. during the introduction of oxygen at a flow rate of 100 cc per minute. The yield of hydrogen peroxide, based upon the amount of hydrogen consumed, was 0.45%.

EXAMPLE 4

The reaction chamber contained phosphoric acid in a concentration of 0.085 weight percent, corresponding to about 0.001 molarity. The reaction chamber was maintained at 87° C. while sparging oxygen at 55 cc per minute. Hydrogen diffused through the palladium tube to form (as in each of the controls and examples) a mixture of $H_2O$ and $H_2O_2$ by reaction with dissolved oxygen. Of importance was the fact that the palladium was coated with 2 milligrams of anthraquinone, corresponding approximately to 0.7 grams per square meter of surface of palladium tube. Hydrogen peroxide was formed at a rate correspondingly to 2.6% of the stoichiometric potentiality.

EXAMPLE 5

The reaction chamber contained phosphoric acid having concentration of 0.34 weight percent (corresponding to about 0.004 molarity), and was heated to the relatively low reaction temperature of 74° C. The oxygen flow rate through the anthraquinone coated tube of Example 4 was 65 cc per minute. Hydrogen peroxide was produced at a rate corresponding to 50% of the stoichiometric possibility. This example indicates that the concentration and composition of the modifier in the aqueous system has a significant effect upon the yield of hydrogen peroxide. Moreover, this example indicates that the minor amount of anthraquinone on the outside of the palladium membrane could be significant, and could be more significant than the redox resin of Example 3.

EXAMPLE 6

The apparatus, aqueous system, etc. of Example 5 was employed but the temperature of the reaction chamber was increased from 74° C. to 86° C. Hydrogen peroxide was produced at a rate corresponding to 85% of the rate of hydrogen consumption. Certain calculations relating to the investment for a large tonnage $H_2O_2$ plant indicated that in view of some of the uncertainties affecting the stability of diffusion tubes, costs for rehabilitating diffusion tubes, investment required at most convenient flow rates of hydrogen etc., suggested that marketing strategy for such a plant for making $H_2O_2$ would resemble marketing strategy for a $H_2O_2$ plant using technology involving lower and more predictable development costs. Accordingly, research was curtailed instead of seeking yields greater than 85%.

EXAMPLE 7

A palladium tube is treated with stannic chloride followed by hydrolysis to leave a surface coating which is partly stannic oxide, partly stannic hydroxide, and partly chloride of tin. A slightly acidic (pH 5.5) aqueous solution was maintained at 80° C. The oxygen flow rate is 80 cc per minute. The yield of hydrogen peroxide is 1.44% of the hydrogen consumption rate. The fact that the stannic hydroxide type of coating was superior to the coating of redox resin of Example 3 suggested that more data was needed for interpreting the reaction mechanism for production of $H_2O_2$ by reaction of diffused hydrogen with the oxygen dissolved in an aqueous acidic solution.

EXAMPLE 8

The reaction chamber contained a mixture of equal parts of water and acetonitrile. This solution and the reaction chamber were maintained at 76°. Hydrogen was diffused through the gold-plated palladium tube to react with the dissolved oxygen in the aqueous acetonitrile. Oxygen was sparged through the aqueous system at a rate of 44 cc per minute. Hydrogen peroxide was formed, but the rate of formation was slightly less than 0.1%. The aqueous acidic solution can include appropriate organic compounds therein.

Various modifications of the invention are possible without departing from the scope of the appended claims.

The invention claimed is:

1. A method of preparing aqueous solution of hydrogen peroxide which method consists of:

providing a slightly acidic aqueous solution containing ions tending to stabilize hydrogen peroxide and substantially free from ions catalyzing the decomposition of hydrogen peroxide;

dissolving oxygen in said aqueous solution; positioning a first surface of a predominantly palladium membrane metallic structure in contact with said aqueous solution containing dissolved oxygen;

controlling the pressure of a hydrogen stream so that hydrogen is supplied to the surface opposite said first surface of said metallic structure at a rate at least equal to the diffusion rate of hydrogen through said membrane;

controlling the temperature of said aqueous solution and said metallic structure to be within the range from 10°–150° C., whereby the hydrogen diffusing to said first surface surface of said membrane reacts with dissolved oxygen to form a reaction mixture consisting of hydrogen peroxide and water plus said aqueous solution;

directing a stream of said reaction mixture to a recovery zone appropriate for the recovery of the thus produced hydrogen peroxide.

2. The method of claim 1 in which the surfaces of said metallic structure are a palladium silver alloy.

3. The method of claim 1 in which said solution contains phosphate ions tending to stabilize hydrogen peroxide.

* * * * *